(12) United States Patent
Iwasaki et al.

(10) Patent No.: US 6,290,379 B1
(45) Date of Patent: Sep. 18, 2001

(54) AIMING MECHANISM OF HEADLAMP FOR AUTOMOBILE

(75) Inventors: Masahito Iwasaki; Masataka Chouji, both of Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/095,499

(22) Filed: Jun. 11, 1998

(30) Foreign Application Priority Data

Jun. 12, 1997 (JP) .................................................. 9-154623

(51) Int. Cl.[7] ........................................................ F21V 17/02
(52) U.S. Cl. ..................... 362/512; 362/507; 362/529; 362/459; 362/368; 362/289; 439/613
(58) Field of Search ..................................... 362/512, 506, 362/507, 529, 459, 66, 61, 481, 524, 368, 429, 449, 289, 324, 530, 476; 439/613

(56) References Cited

U.S. PATENT DOCUMENTS

| | | | |
|---|---|---|---|
| 5,079,676 | * 6/1992 | Lisak ........................................ | 362/66 |
| 5,165,775 | * 11/1992 | Llsak et al. .............................. | 362/66 |
| 5,398,173 | * 3/1995 | Ellenberger ............................. | 362/66 |
| 5,508,896 | * 4/1996 | Suehiro et al. ......................... | 362/66 |
| 5,580,149 | 12/1996 | Kusagaya . | |
| 6,017,137 | * 2/1998 | Suehiro et al. ....................... | 362/289 |

* cited by examiner

Primary Examiner—Sandra O'Shea
Assistant Examiner—Bertrand Zeade
(74) Attorney, Agent, or Firm—Sughrue, Mion, Zinn, Macpeak & Seas, PLLC

(57) ABSTRACT

An aiming mechanism of a headlamp for an automobile, comprises: a lamp housing which is mounted on a vehicle body; a headlamp unit supported tiltably about a tilting fulcrum provided in front of the lamp housing; a hollow cylindrical nut member supported rotatably about an axis by a bearing provided in the lamp housing; and an aiming screw which is threadedly engaged with the nut member, extends forward, is prevented from rotating with respect to the headlamp unit, and is adapted to advance and retract in an axial direction to tilt the headlamp unit connected to a forward end thereof as the nut member is rotated, wherein a crown-shaped gear capable of meshing with teeth of a screwdriver disposed in a direction perpendicular to the aiming screw is formed integrally on the nut member, and at least two screwdriver guides for guiding the screwdriver are provided in vicinities of the bearing.

8 Claims, 8 Drawing Sheets

AIMING MECHANISM OF HEADLAMP FOR AUTOMOBILE

BACKGROUND OF INVENTION

The present invention relates to an aiming mechanism of a headlamp for an automobile.

FIGS. 9 to 11 show a conventional aiming mechanism of a headlamp for an automobile of the unit movable type. On the front side of a lamp housing 1, a lamp unit 2 incorporating a light source 2a is supported by an aiming mechanism which is comprised of a ball joint 3, i.e., a tilting fulcrum, and two aiming screws 4 and 5 respectively capable of advancing and retracting in the axial direction. The lamp housing 1 is provided with a hollow cylindrical bearing 6 extending forwardly, and a nut member 7, which is threadedly engaged with the aiming screw 4 (5) passed through the lamp housing 1 in the depthwise direction and projecting forward, is rotatably supported in this bearing 6. Further, a ball portion 4a (5a) is formed at a forward end portion of the aiming screw 4 (5), and is connected to a ball bearing portion 8a of a nut 8 fitted to the lamp unit 2. An engaging projection 4b (5b) is formed at a distal end of the ball portion 4a (5a), and the engaging projection 4b (5b) abuts against an inner wall of the nut 8 to prevent the aiming screw 4 (5) from rotating.

In addition, a bevel gear 7a is formed integrally with an outer periphery of the nut member 7, and a hollow cylindrical screwdriver guide 9 extending upward is formed integrally with the bearing 6. If a cross head screwdriver (hereafter simply referred to as the screwdriver) D is inserted in this screwdriver guide 9, the teeth of the screwdriver D is engaged with the teeth 7b of the bevel gear. Then, if the nut member 7 is rotated by turning the screwdriver D, the aiming screw 4 (5), which is prevented from rotating with respect to the lamp unit 2, is advanced or retracted in the axial direction (in the direction of the double-headed arrow in FIGS. 10 and 11), which in turn causes the ball bearing portion 4a (5a) to move back and forth. Consequently, the lamp unit 2 is tilted about the horizontal axis Lx and the vertical axis Ly, thereby making it possible to effect aiming adjustment.

With the above-described conventional technique, however, since only one screwdriver guide 9 for insertion of the screwdriver D is provided for each bearing 6, the operation for aiming can be effected only from one limited direction in which the screwdriver D can be inserted, so that the arrangement has been very inconvenient.

In addition, although the members constituting the aiming mechanism, such as the tilting fulcrum (ball joint) 3 and the aiming screws 4 and 5, can be used in common for the left and right headlamps, since the aiming mechanisms in the left and right headlamps are arranged such that the layouts as viewed from the front side of the tilting fulcrum (ball joint) 3 and the aiming screws 4 and 5 become symmetrical, it is difficult to adopt the lamp housing 1 for the left and right headlamps in common. Thus, there has been a limit in an attempt to make the component parts of the left and right headlamps common.

SUMMARY OF INVENTION

The present invention has been devised in view of the above-described problems, and its primary object is to provide an aiming mechanism of a headlamp for an automobile which facilitates the aiming operation using the screwdriver.

Further, its secondary object is to provide an aiming mechanism of a headlamp for an automobile which allow a portion of the lamp housing which is an aiming-mechanism component member to be used in common for the left and right headlamps.

To attain the above primary object, according to the present invention, there is provided an aiming mechanism of a headlamp for an automobile, comprising: a lamp housing which is mounted on a vehicle body; a headlamp unit supported tiltably about a tilting fulcrum provided in front of the lamp housing; a hollow cylindrical nut member supported rotatably about an axis by a bearing provided in the lamp housing; and an aiming screw which is threadedly engaged with the nut member, extends forward, is prevented from rotating with respect to the headlamp unit, and is adapted to advance and retract in an axial direction to tilt the headlamp unit connected to a forward end thereof as the nut member is rotated, wherein a crown-shaped gear capable of meshing with teeth of a screwdriver disposed in a direction perpendicular to the aiming screw is formed integrally on the nut member, and at least two screwdriver guides for guiding the screwdriver are provided in vicinities of the bearing.

In the aiming mechanism of a headlamp for an automobile described above, the lamp housing is comprised of a synthetic resin-made first lamp housing on which a member constituting a fulcrum for tilting a headlamp unit and a vertical aiming screw are disposed as well as a synthetic resin-made second lamp housing on which a horizontal aiming screw provided by being spaced horizontally apart from the first lamp housing is disposed, the bearing for supporting the nut member is formed integrally with each of the first and the second lamp housings, and two or more screwdriver guides are provided on the bearing of at least the second lamp housing.

The lamp housing is separated into two portions, i.e., a first lamp housing and a second lamp housing, and both of them are formed of a synthetic resin. Therefore, the lamp housing as a whole becomes compact and lightweight, and can be molded into an arbitrary shape which matches the shape of the vehicle body. Further, the upper and lower spaces in the rear of the headlamp unit become large, so that positional restraints in the provision of the screwdriver guides can be reduced.

In the aiming mechanism of a headlamp for an automobile described above, the screwdriver guides are provided in an inclined manner on a horizontally outer side in the second lamp housing, and a mounting portion for mounting on a vehicle body is provided on a horizontally inner side in the lamp housing. Since the mounting portion for mounting on a vehicle body is provided on the inner side of the lamp housing, the second lamp housing does not project by a large amount in the outward direction of the headlamp unit.

Further, on the horizontally inner side of the second lamp housing, the interval between the vehicle body and the headlamp unit is small, so that it is inconvenient to insert the screwdriver. On the horizontally outer side of the second lamp housing, the headlamp unit is not located, so that the screwdriver can be easily inserted along the screwdriver guide. Further, foreign objects such as dust and dirt are difficult to enter the screwdriver guides which extend in an inclined manner.

In addition, to attain the above secondary object, in the headlamp for an automobile described above, the screwdriver guides and the mounting portion for mounting on a vehicle body which are provided on the second lamp housing are arranged symmetrically between upper and lower halves or between left and right halves of the second lamp housing. In the case where the screwdriver guides and the mounting portion for mounting on a vehicle body are arranged symmetrically between upper and lower halves or between left and right halves of the second lamp housing, by setting the second lamp housing in a form in which it is rotated 180 degrees, the second lamp housing can be used as the second lamp housing of the aiming mechanism in the other one of the left headlamp and the right headlamp.

In the aiming mechanism of a headlamp for an automobile described above, the mounting portion for mounting on a vehicle is comprised of a mounting hole for fastening by a bolt and a nut and corresponding to a mounting hole on a vehicle body side and a positioning pin corresponding to an engaging hole on the vehicle body side, the mounting hole being constituted by an elongated hole extending in a direction of directly facing the positioning pin. Accordingly, even if there is an error between, on the one hand, the distance between the mounting hole and the pin engaging hole on the vehicle body side and, on the other hand, the distance between the mounting hole and the positioning pin on the lamp housing side, that error can be absorbed by the mounting hole (elongated hole) on the lamp housing side.

DETAILED DESCRIPTION OF PREFERRED EMBODIMENTS

Next, a description will be given of the embodiments of the present invention.

Figure 1:
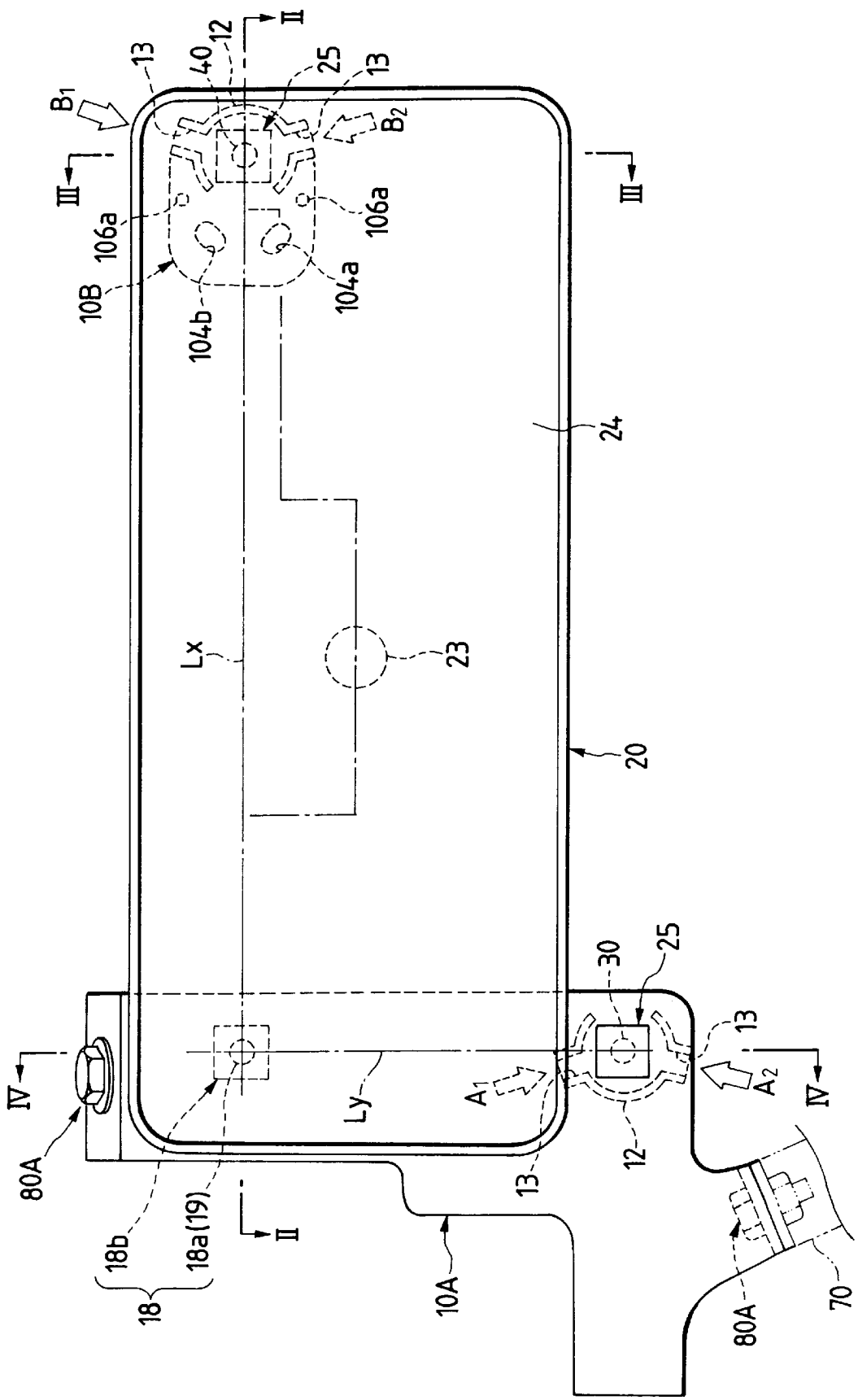
FIG. 1 is a front elevational view of a headlamp for an automobile in accordance with a first embodiment of the present invention.
Figure 2:
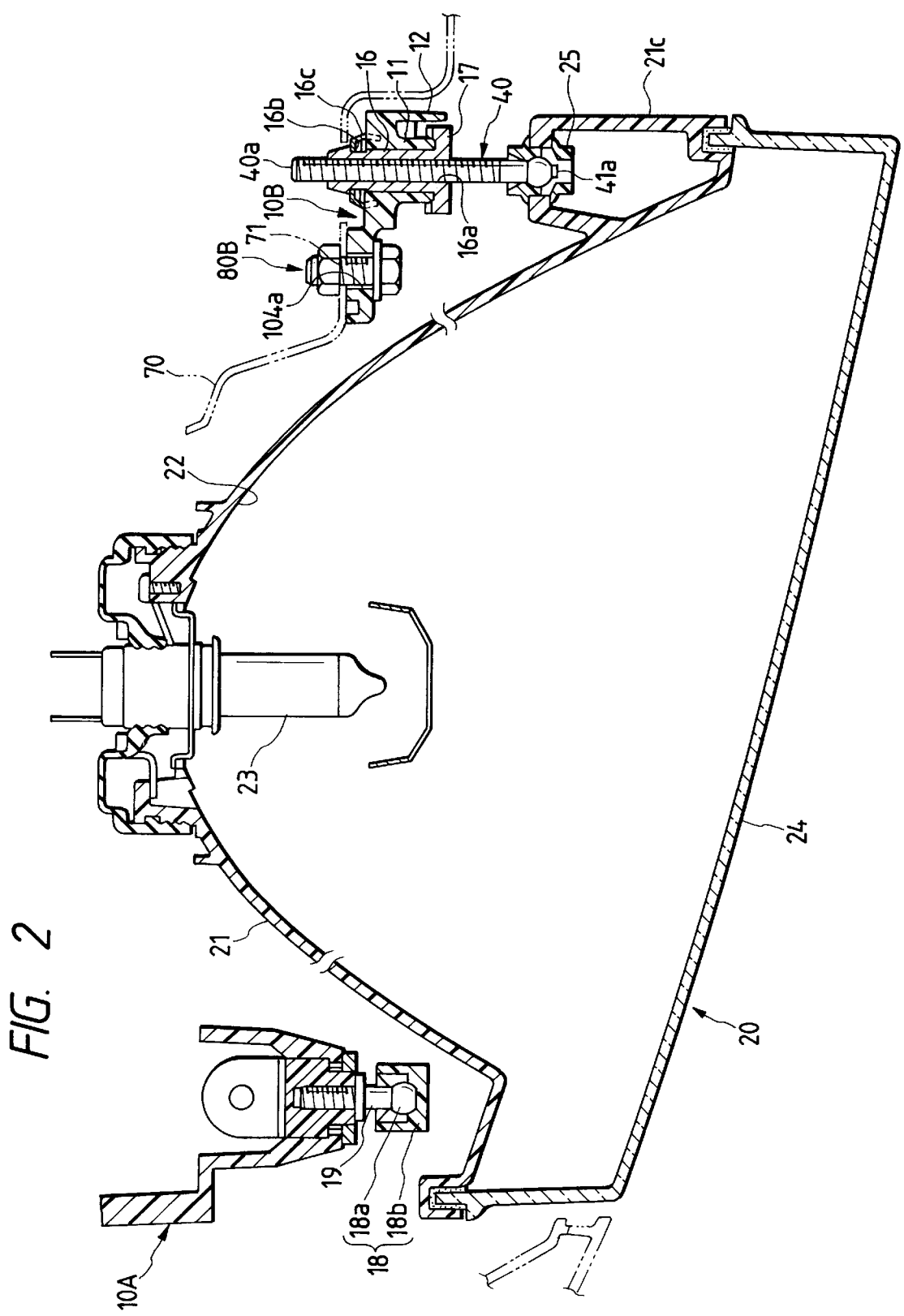
FIG. 2 is a horizontal cross-sectional view of the headlamp (cross-sectional view taken along line II—II shown in FIG. 1)
Figure 3:
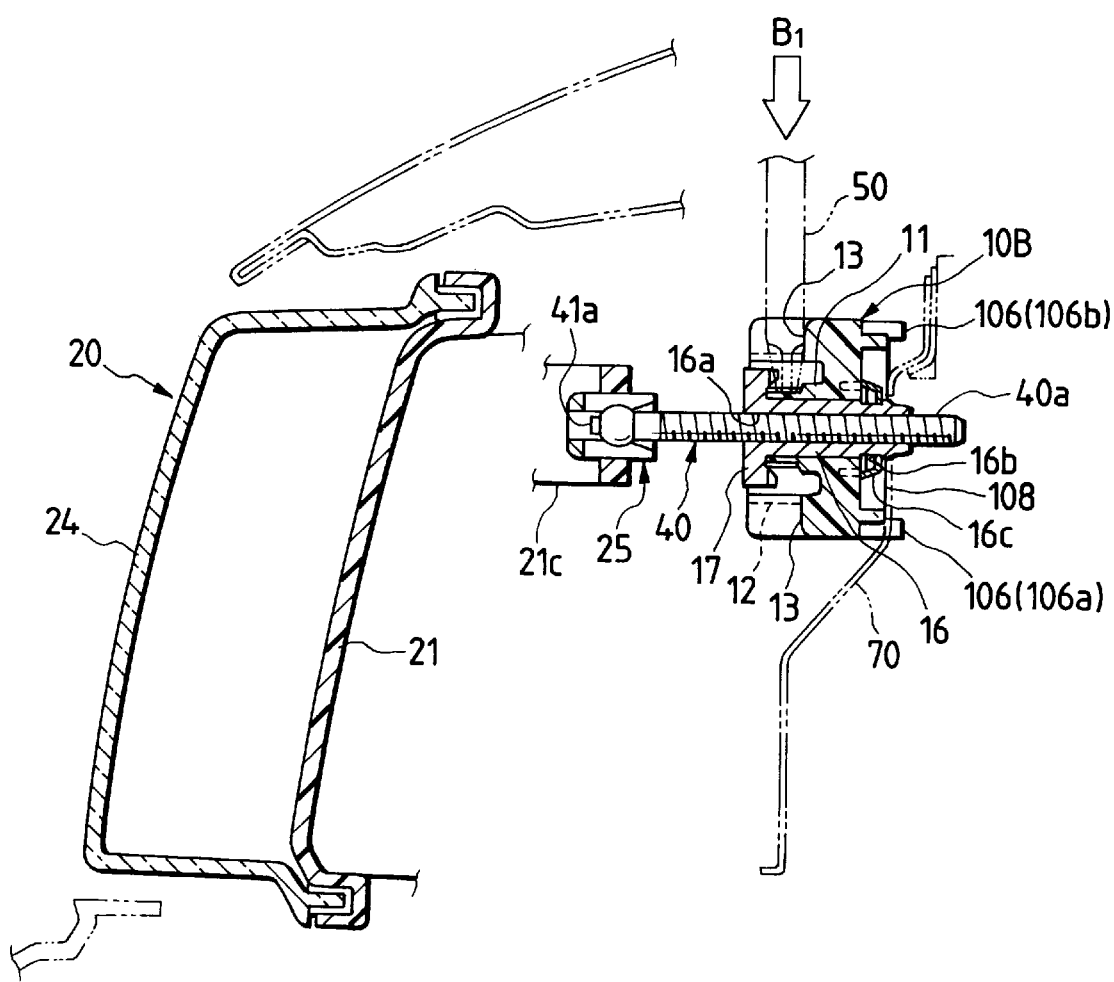
FIG. 3 is a vertical cross-sectional view of the headlamp (cross-sectional view taken along line III—III shown in FIG. 1)
Figure 4:
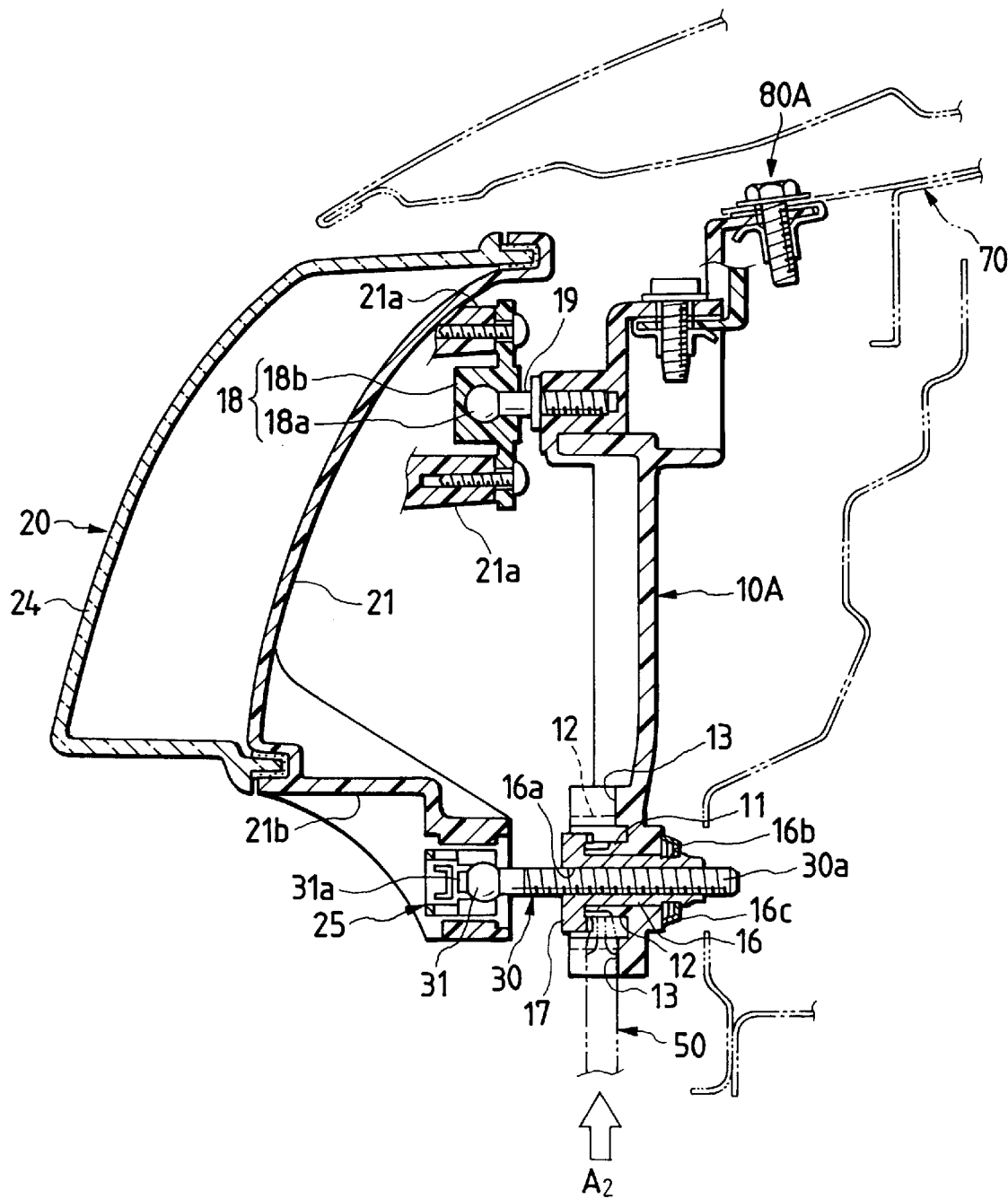
FIG. 4 is a vertical cross-sectional view of the headlamp (cross-sectional view taken along line IV—IV shown in FIG. 1)
Figure 5:
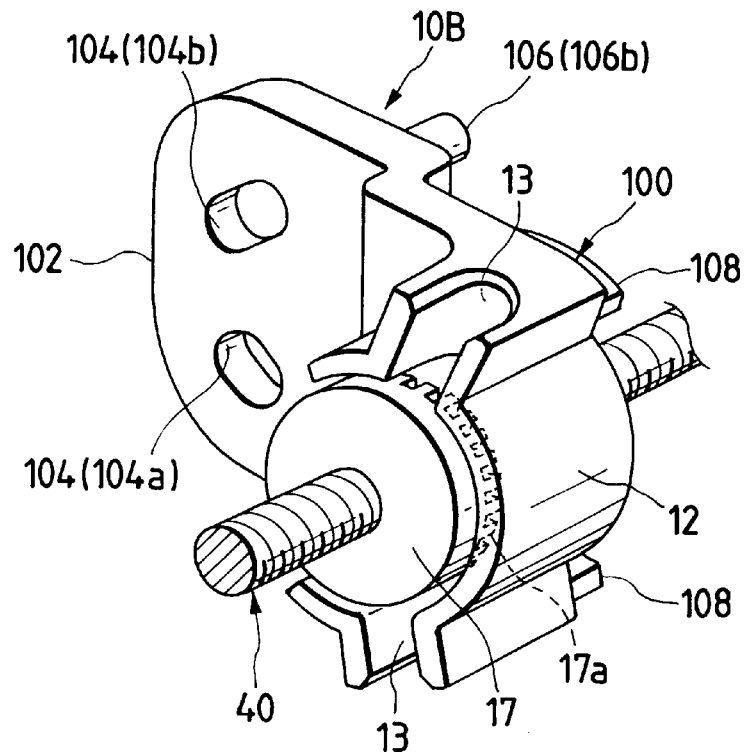
FIG. 5 is a perspective view of a second lamp housing.
Figure 6:
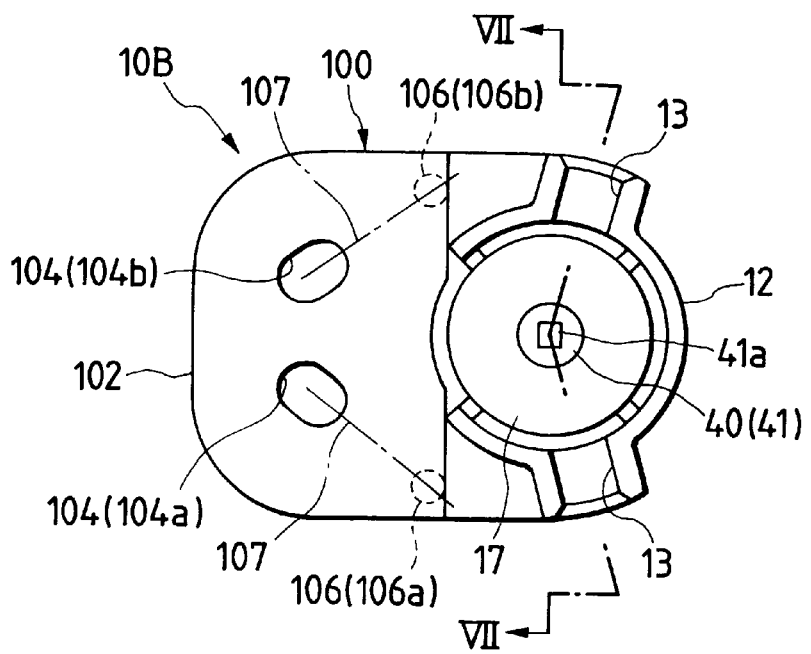
FIG. 6 is a front elevational view of the lamp housing.
Figure 7:
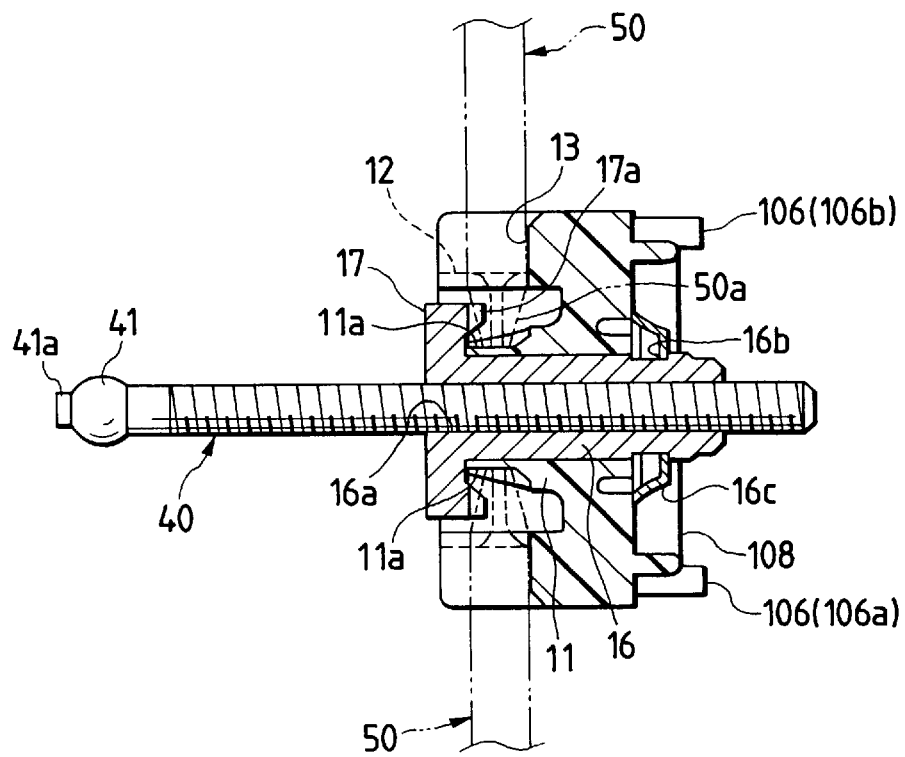
FIG. 7 is a vertical cross-sectional view of the lamp housing (cross-sectional view taken along line VII—VII shown in FIG. 6)

FIGS. 1 to 7 show an embodiment of the present invention, in which FIG. 1 is a front elevational view of a unit-movable type headlamp for an automobile in accordance with a first embodiment of the present invention; FIG. 2 is a horizontal cross-sectional view of the headlamp (cross-sectional view taken along line II—II shown in FIG. 1); FIG. 3 is a vertical cross-sectional view of the headlamp (cross-sectional view taken along line III—III shown in FIG. 1); FIG. 4 is a vertical cross-sectional view of the headlamp (cross-sectional view taken along line IV—IV shown in FIG. 1); FIG. 5 is a perspective view of a second lamp housing; FIG. 6 is a front elevational view of the lamp housing; and FIG. 7 is a vertical cross-sectional view of the lamp housing (cross-sectional view taken along line VII—VII shown in FIG. 6).

In these drawings, lamp housings 10A and 10B are formed of a synthetic resin and mounted and secured to a vehicle body 70 by means of bolts and nuts 80A and 80B. On the front side of the lamp housings 10A and 10B, a right-hand (on the right-hand side as viewed from the driver seat) headlamp unit (hereafter referred to as the unit) 20 is tiltably supported by three members including a metallic aiming screw 30 for vertical tilting adjustment, a aiming screw 40 for horizontal tilting adjustment and having the same structure as the screw 30, and a ball joint 18 formed by a ball portion 18a on the lamp housing side for constituting a tilting fulcrum and a ball bearing portion 18b on the unit side. Namely, the unit 20 is supported by the aiming mechanism comprised of the two aiming screws 30 and 40 and one ball joint 18, in such a manner as to be tiltable in the horizontal direction with respect to the lamp housings 10A and 10B mounted and secured to the vehicle body 70.

The unit 20 has a structure in which a synthetic resin-made lamp body 21 having a parabolic reflector 22 formed integrally on its inner peripheral surface, a bulb 23, i.e., a light source disposed at a focusing position of the reflector 22, and a front lens 24 assembled to the front-side opening portion of the lamp body 21 are formed as a unit.

The ball bearing portion 18b for forming the ball joint 18 is fixedly provided in a boss 21a (see FIG. 4) which is formed in such a manner as to extend from a rear surface of the unit 20 (lamp body 21), and the ball portion 18a at a distal end of a stud bolt 19 fixedly provided on the lamp housing 10A is engaged with the ball bearing portion 18b. In addition, a pair of conventionally known ball bearing members 25 formed of a synthetic resin for preventing the rotation of ball portions 31 and 41 and for rotatably supporting the same are respectively fitted and secured in brackets 21b and 21c formed in such a manner as to extend from the rear surface of the unit 20 (lamp body 21), the ball portions 31 and 41 being respectively formed at distal ends of the aiming screw 30 supported by the lamp housing 10A and the aiming screw 40 supported by the lamp housing 10B (see FIGS. 2, 3, and 4). Engaging projections 31a and 41a are respectively formed at the distal ends of the ball portions 31 and 41, and the engaging projections 31a and 41a abut against the inner walls of the pair of ball bearing members 25 to prevent the aiming screws 30 and 40 from rotating.

For this reason, when the aiming screw 30 (40) is advanced or retracted in the axial direction, the unit 20 can be tilted vertically or horizontally without the occurrence of unexpected stress between the ball portion 31 (41) and the ball bearing member 25.

As for the aiming screw 30 (40), its threaded portion 30a (40a) is threadedly engaged with an internally threaded portion 16a of a hollow cylindrical metallic nut member 16 supported rotatably by the lamp housing 19A (10B), is passed through the lamp housing 10A (10B), and extends forward.

The nut member 16 is pivotally supported by a hollow cylindrical bearing 11 formed integrally with the lamp housing 10A (10B), and a bevel gear 17, which meshes with the teeth 50a of a cross head screwdriver (hereafter simply referred to as the screwdriver) 50 arranged in a direction perpendicular to the aiming screw 30 (40), is formed integrally with an outer periphery of a forward end portion of the nut member 16. The bevel gear 17 has the teeth 17a.

In addition, a shallow groove 16b is circumferential provided at a rear end of the nut member 16 which is passed through the bearing 11 of the lamp housing 10A (10B), a push-on fix 16c is fitted between the groove 16b and a rear end portion of the bearing 11 to prevent the nut member 16 from coming off the bearing 11.

In addition, a hollow cylindrical upright wall 12 surrounding the bearing 11 and the bevel gear 17 is formed in such a manner as to extend from the front surface of the lamp housing 10A (10B), and a screwdriver guide 13, i.e., a vertical hole which is also open in the radial direction, is provided in this upright wall 12. The screwdriver guide 13 is formed to be of such a width that the screwdriver 50 is capable of engaging the same. If the screwdriver 50 is inserted along the screwdriver guide 13, the teeth 50a of the screwdriver are maintained in a state in which they naturally engage the teeth 17a of the bevel gear (see FIGS. 3 and 7).

As such, if the screwdriver 50 is inserted in the screwdriver guide 13, and the screwdriver 50 is rotated, the nut member 16, which is prevented from moving in the axial direction, rotates about the aiming screw 30 (40). As a result, the aiming screw 30 (40), which is prevented from rotating with respect to the unit 20 via the ball bearing members 25, is advanced or retracted in the axial direction, which in turn causes the points (the ball bearing members 25) of supporting the unit by the aiming screw 30 (40) move back and forth. Consequently, the unit 20 is tilted about the horizontal axis Lx and the vertical axis Ly connecting the tilting fulcrum (ball joint 18) and the two ball bearing members 25, thereby making it possible to tilt and adjust the illuminating axis of the headlamp vertically and horizontally.

Further, a vertical groove (see FIG. 7) for positioning the tip of the screwdriver 50 is provided on an outer peripheral surface of the bearing 11 opposing the screwdriver guide 13, so as to maintain the state of engagement between the teeth 50a of the screwdriver 50 and the teeth 17a of the bevel gear 17. Namely, if the outer peripheral surface of the bearing 11 against which the tip of the screwdriver abuts is a smooth surface, there is a possibility that, during the rotating operation of the screwdriver 50, the tip of the screwdriver slips, and the screwdriver 50 is disengaged from the bevel gear 17, making it impossible to rotate the nut member 16 smoothly. For this reason, a recessed portion (vertical groove 11a) for positioning the tip of the screwdriver 50 is provided at a position directly opposite to the screwdriver guide 13 on the outer peripheral surface of the bearing 11 to prevent the screwdriver from becoming disengaged from the bevel gear 17, thereby ensuring smooth rotating operation of the nut member 16 by means of the screwdriver 50.

In addition, two screwdriver guides 13 are provided in each of the lamp housing 10A which supports the aiming screw 30 and the ball joint 18 and the lamp housing 10B which supports the aiming screw 40, so that the screwdriver 50 can be inserted from either of the two directions, i.e., a diagonally upward direction and a diagonally downward direction, as shown by arrows A1, A2, B1, and B2 in FIG. 1, to perform the aiming operation. Incidentally, each screwdriver guide 13 which is open downward serves as a drain hole for discharging water which entered the interior of the upright wall 12.

In particular, the screwdriver guides 13 in the lamp housing 10B are arranged to exhibit a symmetry between the upper and lower halves on a housing body 100 which is substantially rectangular in a front view, as shown in FIGS. 5, 6, and 7. In addition, mounting portions for mounting on a vehicle body each having a mounting hole 104 and a positioning pin 106 are provided in the housing body 100, and these members are also arranged to exhibit a symmetry between the upper and lower halves.

That is, two mounting holes 104 for mounting the lamp housing 10B on the vehicle body 70 by fastening with bolts and nuts 80B are provided in a rectangular plate-shaped base 102 extending laterally from the housing body 100. Further, two positioning pins 106 for positioning the position for mounting the lamp housing 10B are projectingly provided on the rear surface of the base 102. These mounting holes 104 (104a, 104b) and positioning pins 106 (106a, 106b) are also arranged to exhibit a symmetry between the upper and lower halves on the housing body 100.

Then, if the lower positioning pin 106a is engaged in a pin engaging hole (not shown) formed in the vehicle body 70, and a peripheral edge portion of a mounting hole 71 on the vehicle body 70 side and a peripheral edge portion of the mounting hole 104a on the lamp housing side are fastened together by means of the bolt and nut 80B, the lamp housing 10B is secured to the vehicle body 70. Incidentally, an area corresponding to the upper positioning pin 106b in the second lamp housing 10B-mounting surface of the vehicle body 70 is set backward, as shown in FIG. 3, so that the positioning pin 106 does not interfere with the vehicle body 70.

Thus, since the lamp housing 10B in which the two screwdriver guides 13, the two mounting holes 104, and the two positioning pins 106 are formed is formed symmetrically between the upper and lower halves, if this second lamp housing 10B in the right headlamp is set in a form in which it is rotated 180 degrees, and the positioning pin 106b which was not used in the right headlamp is engaged in a predetermined pin engaging hole on the vehicle body side, and if a peripheral edge portion of the mounting hole 104b which was similarly not used in the right headlamp and a peripheral edge portion of a predetermined mounting hole of the vehicle body are fastened together by a bolt and a nut, then the second lamp housing 10B in the right headlamp can also be used as the second lamp housing in the left headlamp.

In addition, the mounting hole 104 (104a, 104b) has an inside diameter which matches the outside diameter of the fastening bolt, but is formed as an elongated hole extending in the direction (see reference numeral 107 in FIG. 6) of directly facing the positioning pin 106 (106a, 106b). Even if there is an error between, on the one hand, the distance between the mounting hole and the pin engaging hole on the vehicle body side and, on the other hand, the distance between the mounting hole and the positioning pin on the lamp housing side, that error can be absorbed by the elongated hole 104 (104a, 104b), so that the second bracket 10B can always be secured at an appropriate predetermined position.

It should be noted that a hollow cylindrical upright wall 108 is provided in such a manner as to surround the rearwardly projecting portion of the nut member 16. By virtue of this upright wall 108, the rear surface of the housing body 100 becomes flush with the base 102, thereby securing a flat abutment surface with respect to the vehicle body 70.

Figure 8:
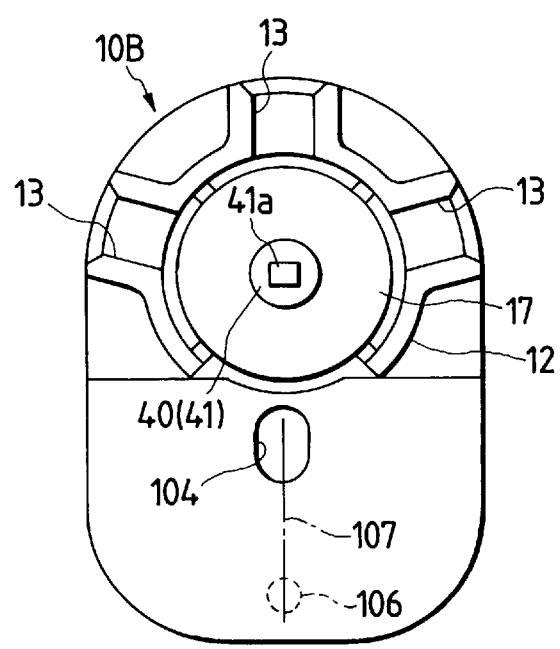
FIG. 8 is a front elevational view of a second lamp housing which is an essential portion of a second embodiment of the present invention.
Figure 9:
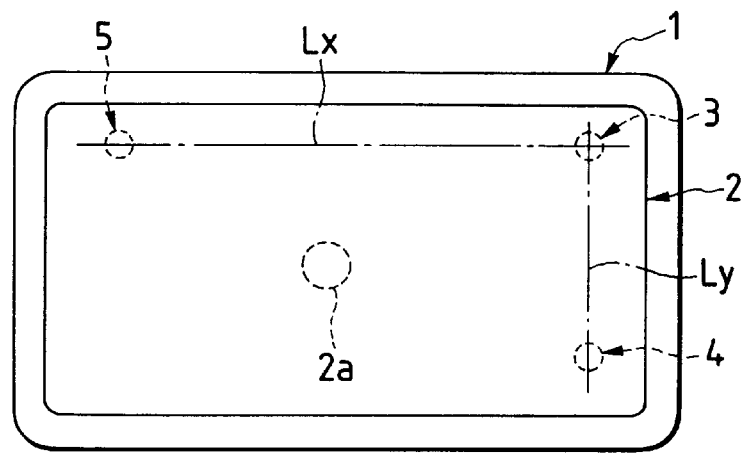
FIG. 9 is a front elevational view of a conventional headlamp.
Figure 10:
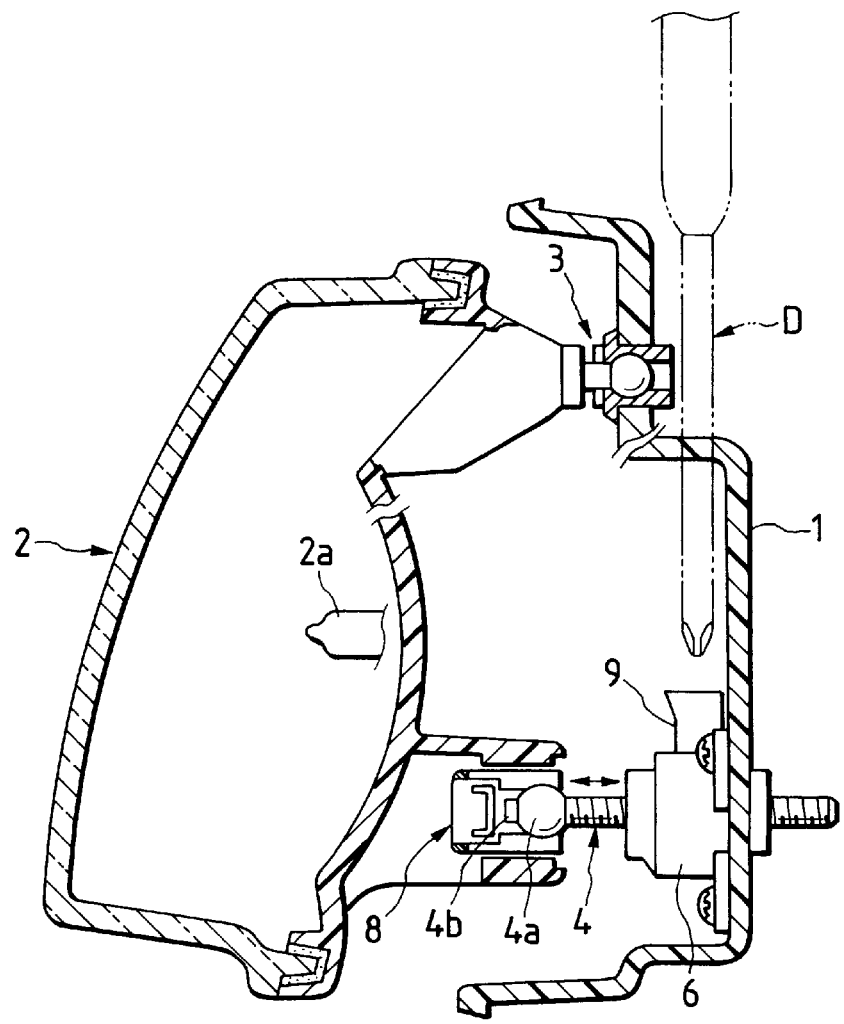
FIG. 10 is a vertical cross-sectional view of the headlamp.
Figure 11:
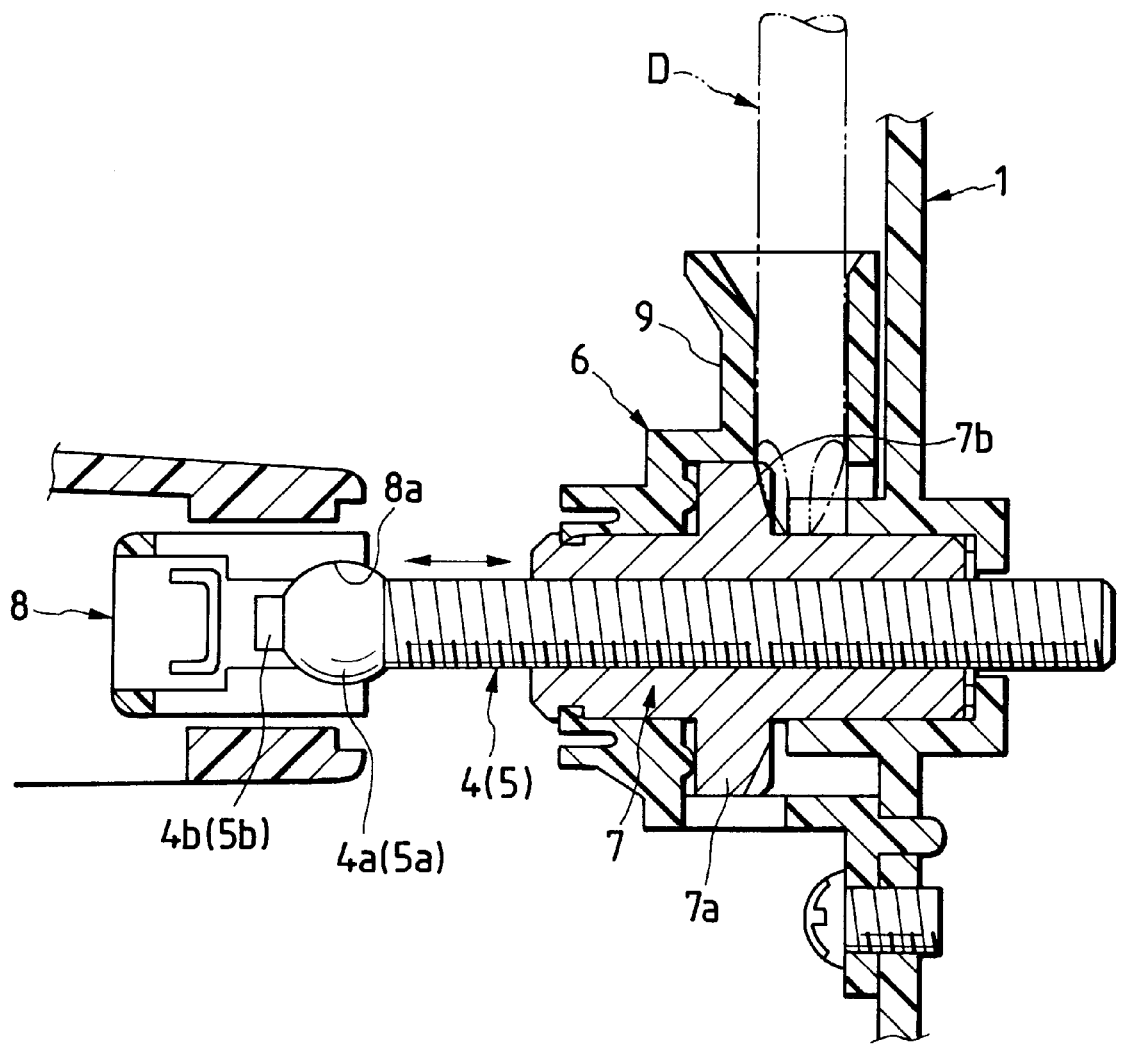
FIG. 11 is an enlarged cross-sectional view of the aiming mechanism of the headlamp.

FIG. 8 is a front elevational view of a second lamp housing which is an essential portion of a second embodiment of the present invention.

Although, in the second lamp housing 10B in the above-described first embodiment, two screwdriver guides 13, two mounting holes 104, and two positioning pins 106 are arranged to exhibit a symmetry between the upper and lower halves, and by rotating the lamp housing 10B, 180 degrees, the lamp housing 10B can be used as either the right or the left headlamp, in the second lamp housing 10B in this second embodiment, three screwdriver guides 13, one mounting hole 104, and one positioning pin 106 are arranged to exhibit a symmetry between the left and right halves, and the second lamp housing 10B in this embodiment can also be as either the right or the left headlamp.

In addition, the mounting hole 104 is formed as an elongated hole extending in the direction (see reference numeral 107 in FIG. 7) of directly facing the positioning pin 106 (106*a*, 106*b*), and is capable of absorbing a positional error in the distance between the mounting hole and the pin engaging hole on the vehicle body side.

Although, in the nut member 16 in the above-described first embodiment, the bevel gear 17 is formed integrally with the nut member 16, an arrangement may be provided such that a crown-shaped gear formed separately from a hollow cylindrical nut member may be secured integrally on the nut member.

Although, in the above-described first and second embodiments, the lamp housing disposed in the rear of the headlamp unit and mounted on the vehicle body is structured as being separated into left and right portions as the first lamp housing 10A and the second lamp housing 10B, the lamp housing may be structured as being formed as a unit.

As is apparent from the foregoing description, in accordance with the aiming mechanism of the headlamp for an automobile of the invention, as compared with the conventional example in which the aiming operation using the screwdriver is possible only from one direction, the aiming operation can be effected from a plurality of directions. Hence, there is an advantage in that the aiming operation is facilitated accordingly.

Since the lamp housing is made compact and its weight become light, the mounting of the headlamp on the vehicle body is facilitated, and a contribution can be made to the reduction of the overall weight of the automobile.

In addition, since the upper and lower spaces in the rear of the headlamp unit are made open, it is possible to reduce positional restraints on the position where the screwdriver guides for insertion of the screwdriver for aiming operation are formed. Thus, the degree of freedom in the design of the configuration of the lamp housing increases.

Since the second lamp housing can be arranged not to project by a large amount in the outward direction of the headlamp unit, the lighting equipment adjacent to the headlamp can be easily disposed by that portion.

Further since the screwdriver can be easily inserted along the screwdriver guide, aiming adjustment is facilitated.

Further, since the possibility that foreign objects such as dirt, which entered from the screwdriver guide, is deposited on the crown-shaped gear is small, proper engagement between the screwdriver and the crown-shaped gear can be ensured.

Since a portion of the lamp housing can be used commonly for the left and right headlamps, the number of component parts of the headlamp can be reduced.

Since even if there is a slight dimensional error between the mounting portion for mounting on a vehicle body on the second lamp housing side and the mounting portion for mounting the second lamp housing on the vehicle body side, that error can be absorbed by the mounting hole (elongated hole) on the lamp housing side. Hence, the second lamp housing can always be mounted at an appropriate position.

What is claimed is:

1. An aiming mechanism of a headlamp for an automobile, comprising:

a lamp housing which is mounted on a vehicle body;

a headlamp unit supported tiltably about a tilting fulcrum provided in front of the lamp housing;

a hollow cylindrical nut member supported rotatably about an axis by a bearing provided in the lamp housing; and an aiming screw which is threadedly engaged with the nut member, extends forward, is prevented from rotating with respect to the headlamp unit, and is adapted to advance and retract in an axial direction to tilt the headlamp unit connected to a forward end thereof as the nut member is rotated, wherein a crown-shaped gear capable of meshing with teeth of a screwdriver disposed in a direction perpendicular to the aiming screw is formed integrally on the nut member, and at least two separate screwdriver guides for guiding the screwdriver are provided in vicinities of the bearing, so that an aiming operation can be conducted from a plurality of different directions.

2. The aiming mechanism of a headlamp for an automobile according to claim 1, wherein the lamp housing comprises a synthetic resin-made first lamp housing on which a member constituting a fulcrum for tilting a headlamp unit and a vertical aiming screw are disposed, and a synthetic resin-made second lamp housing in which a horizontal aiming screw provided by being spaced horizontally apart from the first lamp housing is disposed, the bearing for supporting the nut member is formed integrally with the first lamp housing and a second bearing for supporting a second nut member is formed integrally with the second lamp housing, and two or more screwdriver guides are provided in vicinities of the second bearing of at least the second lamp housing.

3. An aiming mechanism of a headlamp for an automobile, comprising:

a lamp housing which is mounted on a vehicle body;

a headlamp unit supported tiltably about a tilting fulcrum provided in front of the lamp housing;

a hollow cylindrical nut member supported rotatably about an axis by a bearing provided in the lamp housing; and an aiming screw which is threadedly engaged with the nut member, extends forward, is prevented from rotating with respect to the headlamp unit, and is adapted to advance and retract in an axial direction to tilt the headlamp unit connected to a forward end thereof as the nut member is rotated, wherein a crown-shaped gear capable of meshing with teeth of a screwdriver disposed in a direction perpendicular to the aiming screw is formed integrally on the nut member, and at least two screwdriver guides for guiding the screwdriver are provided in vicinities of the bearing, wherein the lamp housing comprises a synthetic resin-made first lamp housing on which a member constituting a fulcrum for tilting a headlamp unit and a vertical aiming screw are disposed, and a synthetic resin-made second lamp housing in which a horizontal aiming screw provided by being spaced horizontally apart from the first lamp housing is disposed, the bearing for supporting the nut member is formed integrally with the first lamp housing and a second bearing for supporting a second nut member is formed integrally with the second lamp housing, and two or more screwdriver guides are provided in vicinities of the second bearing of at least the second lamp housing, wherein the screwdriver guides are provided in an inclined manner on a horizontally outer side in the second lamp housing, and a mounting portion for mounting on a vehicle body is provided on a horizontally inner side in the lamp housing.

4. The aiming mechanism of a headlamp for an automobile according to claim 3, wherein the screwdriver guides and the mounting portion for mounting on a vehicle body which are provided on the second lamp housing are arranged symmetrically between upper and lower halves or between left and right halve of the second lamp housing.

5. The aiming mechanism of a headlamp for an automobile according to claim 4, wherein the mounting portion for mounting on a vehicle is comprised of a mounting hole for fastening by a bolt and a nut and corresponding to a mounting hole on a vehicle body side and a positioning pin corresponding to an engaging hole on the vehicle body side, the mounting hole being constituted by an elongated hole extending in a direction of directly facing the positioning pin.

6. The aiming mechanism of a headlamp for an automobile according to claim 3, wherein the mounting portion for mounting on a vehicle is comprised of a mounting hole for fastening by a bolt and a nut and corresponding to a mounting hole on a vehicle body side and a positioning pin corresponding to an engaging hole on the vehicle body side, the mounting hole being constituted by an elongated hole extending in a direction of directly facing the positioning pin.

7. An aiming mechanism of a headlamp for an automobile, comprising:

a lamp housing which is mounted on a vehicle body;

a headlamp unit supported tiltably about a tilting fulcrum provided in front of the lamp housing;

a hollow cylindrical nut member supported rotatably about an axis by a bearing provided in the lamp housing; and an aiming screw which is threadedly engaged with the nut member, extends forward, is prevented from rotating with respect to the headlamp unit, and is adapted to advance and retract in an axial direction to tilt the headlamp unit connected to a forward end thereof as the nut member is rotated, wherein a crown-shaped gear capable of meshing with teeth of a screwdriver disposed in a direction perpendicular to the aiming screw is formed integrally on the nut member, and at least two screwdriver guides for guiding the screwdriver are provided in vicinities of the bearing, wherein the lamp housing comprises a synthetic resin-made first lamp housing on which a member constituting a fulcrum for tilting a headlamp unit and a vertical aiming screw are disposed, and a synthetic resin-made second lamp housing in which a horizontal aiming screw provided by being spaced horizontally apart from the first lamp housing is disposed, the bearing for supporting the nut member is formed integrally with the first lamp housing and a second bearing for supporting a second nut member is formed integrally with the second lamp housing, and two or more screwdriver guides are provided in vicinities of the second bearing of at least the second lamp housing, wherein the screwdriver guides and the mounting portion for mounting on a vehicle body which are provided in vicinities of the second lamp housing are arranged symmetrically between upper and lower halves or between left and right halves of the second lamp housing.

8. The aiming mechanism of a headlamp for an automobile according to claim 5, wherein the mounting portion for mounting on a vehicle is comprised of a mounting hole for fastening by a bolt and a nut and corresponding to a mounting hole on a vehicle body side and a positioning pin corresponding to an engaging hole on the vehicle body side, the mounting hole being constituted by an elongated hole extending in a direction of directly facing the positioning pin.

* * * * *